March 6, 1962  E. H. DINGER  3,024,401
MOTOR CONTROL CIRCUIT
Filed Aug. 24, 1960  2 Sheets-Sheet 1

INVENTOR:
EDWARD H. DINGER,
BY *James J. Williams*
HIS ATTORNEY.

March 6, 1962  E. H. DINGER  3,024,401

MOTOR CONTROL CIRCUIT

Filed Aug. 24, 1960  2 Sheets-Sheet 2

INVENTOR:
EDWARD H. DINGER,
BY James G. Williams
HIS ATTORNEY.

United States Patent Office 3,024,401
Patented Mar. 6, 1962

3,024,401
MOTOR CONTROL CIRCUIT
Edward H. Dinger, Waynesboro, Va., assignor to General Electric Company, a corporation of New York
Filed Aug. 24, 1960, Ser. No. 51,590
12 Claims. (Cl. 318—327)

The invention relates to a motor control circuit, and particularly to a motor control circuit that utilizes a saturable core device for controlling the speed of a direct current motor.

Presently, many applications of electric motors not only require that the motor have a controllable speed, but also require that this speed, when selected, remain substantially constant despite changes in the load on the motor. Because of these requirements, direct current motors are used with a control circuit in a great number of such applications for the purpose of providing the desired control functions and operations. It is, therefore, an object of the invention to provide a novel control circuit for controlling the speed of a direct current motor.

Another object of the invention is to provide a control circuit utilizing a saturable core device for controlling the speed of a direct current motor.

Another object of the invention is to provide a control circuit for enabling the speed of a direct current motor to be selected and for maintaining the speed at substantially the same selected level despite changes in load on the motor.

Another object of the invention is to provide a control circuit which utilizes a saturable core device and which operates in accordance with the actual speed of the motor armature.

These and other objects are accomplished in accordance with the invention by a rectifier device coupled in a series circuit with the armature of a direct current motor, the series circuit being coupled across a source of alternating current. A saturable core device having an energizing winding and a reset winding is provided with the energizing winding coupled to the series circuit. On appropriate half cycles, the alternating current has the proper polarity to cause a current to flow through the rectifier device in the forward direction. During these half cycles, the point in time when the current actually begins to flow, and hence the average current supplied to the armature, is determined by the condition of the saturable core device. This condition is controlled during the other half cycles by a reset current which flows in the reset winding. This reset current has a magnitude and direction which is determined by the relative magnitudes of a voltage indicative of armature speed and of a selected reference voltage.

The invention will be better understood from the following description taken in connection with the accompanying drawing and its scope will be pointed out in the claims. In the drawings:

Figure 1:
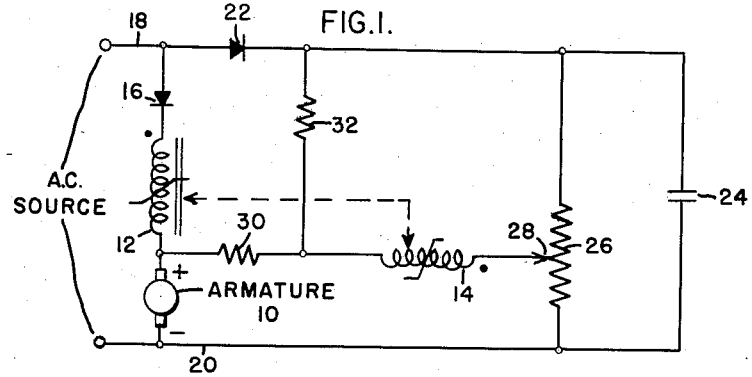
FIGURE 1 shows a fundamental embodiment of a control circuit in accordance with the invention.

In the figures, the same reference numerals are used to refer to the same parts. With reference to FIGURE 1, there is shown an armature 10 of a direct current motor. While the motor field winding is not shown, it is preferably a shunt winding which may be energized by any suitable source of direct current. The armature 10 is connected in a series circuit which includes an energizing winding 12 of a saturable core device. The saturable core device is also provided with a reset winding 14. In the figures, the energizing winding 12 and the reset winding 14 are indicated as being coupled to or wound on the same saturable core by the dashed line and arrows. The instantaneous relative polarities of voltages in the two windings 12, 14 are indicated by the dots. As is known, a saturable core device has a hysteresis loop which has a substantially parallelogram shape, and which is substantially flat at both extremes of saturation. Thus, when a magnetizing force of a given direction is applied to the core of the saturable core device, it tends to magnetize the core in a given direction. Once saturation is reached, no additional flux is produced by increasing the magnetizing force in the same direction, and windings coupled to the core present relatively little impedance. If a magnetizing force of the opposite direction is then applied to the core, a finite time is required to reduce the magnetization in the core, or to reverse the magnetization, or to saturate the core in the opposite direction. This characteristic is indicated schematically by the single hysteresis loop lines superimposed on the energizing winding 12 and the reset winding 14. The series circuit also includes a first rectifier 16. This series circuit is coupled between or across two leads 18, 20 which, in turn, are coupled to a suitable source of alternating current. A source of unidirectional reference potential is provided by means of a second rectifier 22 which has its anode coupled to the lead 18 and its cathode coupled to one end of a filter capacitor 24 and a potentiometer 26. The other ends of the capacitor 24 and potentiometer 26 are coupled to the lead 20. The potentiometer 26 is provided with a movable tap 28 which engages the potentiometer 26 over its movement for selecting the desired magnitude of reference potential and applying it to one end of the reset winding 14. The other end of the reset winding 14 is coupled through a current limiting resistor 30 to the positive terminal of the armature 10. The negative terminal of the armature 10 is coupled to the negative end of the potentiometer 26 by means of the lead 20. A zero speed resistor 32 may be provided if desired to permit the armature 10 to be stopped. This resistor 32 is coupled between the junction of the reset winding 14 and the current limiting resistor 30 and between the cathode of the second rectifier 22.

When an alternating current is applied to the leads 18, 20, the series circuit comprising the first rectifier 16, the energizing winding 12, and the armature 10 can conduct current during those alternate half cycles of alternating current (hereinafter referred to as the energizing half cycles) when the lead 18 is positive with respect to the lead 20. Under this condition, the first rectifier 16 is biased in the forward direction so that it can pass current. However, the energizing winding 12 of the saturable core device may present an impedance to this series circuit such that the current through the series circuit is limited by this impedance. The impedance presented by the energizing winding 12 depends upon the state of magnetization of the saturable core device and exists until such time as the core becomes saturated in the forward direction. At this time, the energizing winding 12 presents a minimum or no impedance to the series circuit. The time required for this impedance of the energizing winding 12 to be overcome depends upon the state of magnetization of the core of the saturable core device at the start of the energizing half cycle. In accordance with the invention this former state of magnetization is determined by the direction and magnitude of current which flowed through the reset winding 14 during the previous half cycle (hereinafter referred to as the reset half cycle) when the lead 18 is negative with respect to the lead 20. During a reset half cycle, the first rectifier 16 is biased in the reverse direction, and no current flows in the series circuit. However, the armature 10 produces a back electromotive force (E.M.F.) which has the polarity shown and which has a magnitude dependent, among other things, upon the armature speed. The back E.M.F. is utilized during the reset half cycles to determine the direction and magnitude of a reset current in the reset winding 14. If, as is normally the case, the back E.M.F. of the armature 10 exceeds the selected reference potential, a reset current flows from left to right through the reset winding 14. The magnitude of the reset current depends upon the relative magnitudes of the back E.M.F. and the selected reference. A reset current from left to right in the reset winding 14 shown in FIGURE 1 produces a flux which tends to magnetize the core of the saturable core device in the reset direction which is opposite to the forward direction toward which current flow in the series circuit (during an energizing half cycle) tends to magnetize the core. When the core is magnetized in the reset direction, the energizing winding 12 presents an impedance to forward current flow in the series circuit during the next energizing half cycle until the core is saturated in the forward direction. Hence only a relatively small exciting current flows in the energizing winding 12 until the core is saturated in the forward direction. If, during a reset half cycle, the back E.M.F. is less than the selected reference potential, a reset current flows from right to left in the reset winding 14 shown in FIGURE 1. Such a reset current produces a flux which tends to magnetize the core of the saturable core device in the forward direction which is the same forward direction toward which current flow in the series circuit (during an energizing half cycle) tends to magnetize the core. When the core is magnetized in the forward direction, the energizing winding 12 presents an impedance to forward current flow in the series circuit during the next energizing half cycle for a relatively short length of time. Or if the core is saturated in the forward direction, the energizing winding 12 will present no impedance during the next energizing half cycle. During the energizing half cycles, the armature 10 receives an appreciable pulse of current (greater than the exciting current) beginning at the time when the impedance of the energizing winding 12 is reduced to a minimum by the core becoming saturated in the forward direction. This time is determined by the state of magnetization of the core, which in turn is determined by the reset current. The reset current, in turn, is determined by the relative magnitudes of the back E.M.F. during reset half cycles and the reference voltage. If the back E.M.F. (and hence the armature speed) exceeds the reference voltage, reset current flows during the reset half cycle to magnetize the core so that the energizing winding 12 presents an impedance during the next energizing half cycle. The time when forward current is supplied to the armature 10 depends upon the amount of magnetization in the core, and hence the power supplied to the armature 10 is determined by the relation of the armature speed (indicated by the back E.M.F.) and the reference voltage. It will be seen that reset current of various magnitudes can flow in both directions (but usually in the reset direction) through the reset winding.

If it is desired to stop the armature 10, the tap 28 is moved down to the lowest position where it is effectively connected to the lead 20. This condition permits the greatest reset current to flow in the reset winding 14 so that less current is supplied to the armature 10 during energizing half cycles and the armature 10 slows down. Slowing down of the armature 10 reduces the back E.M.F. and hence the reset current until at zero armature speed there is no back E.M.F. and hence no reset current in the reset direction. If there were no reset current in the reset direction, energizing current would be supplied to the armature 10 during energizing half cycles so as to cause rotation of the armature 10, despite the desire for no armature rotation and the location of the tap 28 at the lowest position. This condition is relieved by the zero speed resistor 32 which provides sufficient reset current in the reset direction through the reset winding 14 when the back E.M.F. is zero as a result of the armature 10 being stopped.

Figure 2:
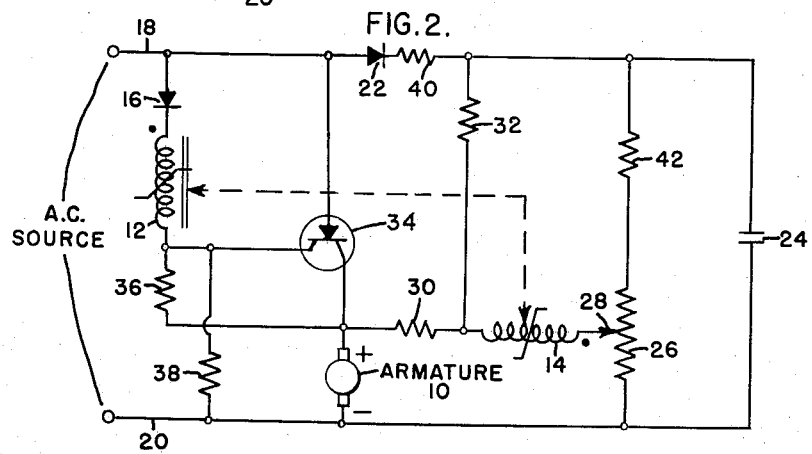
FIGURES 2 and 3 show embodiments of a control circuit in accordance with the invention that utilize a controlled rectifier device.

FIGURE 2 shows another embodiment of the control circuit in accordance with the invention which uses a controlled rectifier 34 such as a thyratron or a silicon controlled rectifier in the series circuit. A silicon controlled rectifier is shown in FIGURE 2 and includes an anode, a cathode and a gate or control electrode. Such devices are known in the art, and serve to provide a solid-state device which permits control of relatively large amounts of current. The anode-cathode path of the controlled rectifier 34 is coupled in series with the armature 10 between the leads 18, 20. The first rectifier 16 and the energizing winding 12 are coupled in series between the lead 18 and the gate or control electrode of the controlled rectifier 34. A control resistor 36 is coupled between the gate electrode and the cathode of the controlled rectifier 34, and a bias resistor 38 is coupled between the gate electrode of the controlled rectifier 34 and the lead 20. A voltage dropping resistor 40 is coupled in series with the second rectifier 22 for the purpose of providing the desired voltage to the zero speed resistor 32 and the reference potential source. A limiting resistor 42 is coupled in series with the potentiometer 26 for the purpose of limiting the maximum speed which can be selected by movement of the movable tap 28. Persons skilled in the art will appreciate that the resistors 40, 42 may be varied to meet particular needs, or the circuit may be designed so that these resistors 40, 42 are not necessary.

In operation, the circuit of FIGURE 2 functions in substantially the same manner as the operation described in connection with FIGURE 1. However, the armature 10 of the circuit in FIGURE 2 is supplied with current which passes through the anode-cathode path of the controlled rectifier 34. This current is controlled by the voltage on the gate electrode of the controlled rectifier 34. The bias resistor 38 is selected so that the gate electrode is negative with respect to the cathode and hence the controlled rectifier 34 does not normally conduct current. However, during the energizing half cycles (i.e., when the lead 18 is positive with respect to the lead 20), the appreciable current begins to flow at some time (determined by the condition of the core) in these half cycles from the lead 18 through the series circuit comprising the first rectifier 16, the energizing winding 12, the control resistor 36, and the armature 10 to the lead 20. Once this current begins to flow, a voltage is developed across the control resistor 36 so that at some point the control or gate electrode of the controlled rectifier 34 becomes sufficiently positive to cause conduction of current through the anode-cathode path of the controlled rectifier 34 and thus supply the armature 10 with current. During the reset half cycles, when the lead 18 is negative with respect to the lead 20, the series circuit cannot conduct current because the controlled rectifier 34 is biased in the reverse direction. During these reset half cycles, reset current flows through the reset winding 14, the magnitude and direction of this current depending upon the relative magnitudes of the back E.M.F. of the armature 10 and the reference voltage selected by the movable tap 28. As explained in connection with FIGURE 1, when reset current flows through the reset winding 14, the core of the saturable core device is magnetized to a state determined by the magnitude of the reset current, i.e., the speed of the motor. When the next energizing half cycle occurs, current flows through the series circuit including the energizing winding 12 at the point in time with respect to the energizing half cycle when the core of the saturable core device becomes saturated in the forward condition. One advantage of the circuit shown in FIGURE 2 with respect to the circuit shown in FIGURE 1 is that armature current flows only through the controlled rectifier device 34, and need not flow through the energizing winding 12. Thus, the energizing winding 12 and hence the reset winding 14 of the saturable core device may be made physically and electrically smaller and still accomplish the necessary functions. Also, since less current flow is necessary through the energizing winding 12, the electrical capabilities of the first rectifier 16 and certain other components may be smaller in the circuit of FIGURE 2 than in the case of the circuit of FIGURE 1.

Figure 3:
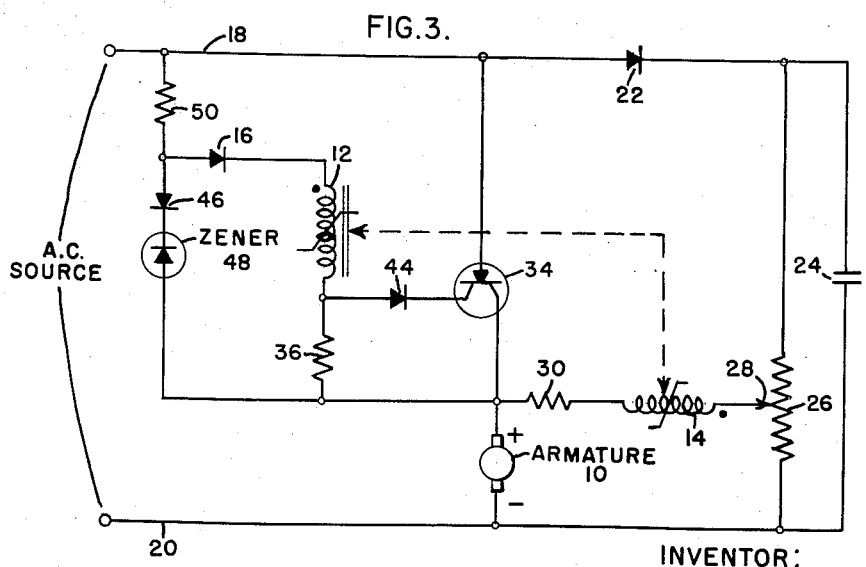

In FIGURE 3, the arrangement shown is substantially the same as that shown in FIGURE 2. However, the bias resistor 38 which is shown in FIGURE 2 to hold the control electrode negative with respect to the cathode has been replaced by a bias rectifier 44. The bias rectifier 44 insures that the control electrode of the controlled rectifier 34 is normally at some voltage which is negative with respect to the cathode voltage in the absence of a predominating positive voltage provided by the control resistor 36. In addition, an isolating rectifier 46 is coupled in series with a Zener diode 48 to provide a constant voltage across the circuit made up of the first rectifier 16, the energizing winding 12, and the control resistor 36. A voltage dropping resistor 50 is coupled between the lead 18 and the rectifiers 16, 46. Thus, the voltage across the energizing winding 12 is limited by the breakdown voltage of the Zener diode 48 and consequently the required number of turns in the energizing winding 12 may be reduced. However, this is a feature which may or may not be desirable in all applications.

Figure 4:
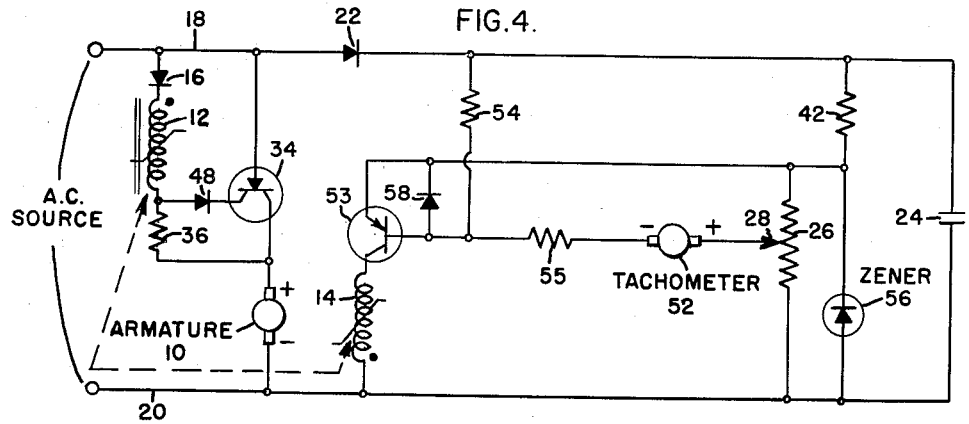
FIGURE 4 shows an embodiment of a control circuit in accordance with the invention that utilizes a tachometer.

FIGURE 4 shows another embodiment of the invention, which uses a tachometer or other speed indicating device 52 to provide a more accurate voltage indication of the speed of the armature 10 than is provided by the back E.M.F. of the armature 10 itself. In addition, a PNP transistor 53 may be used to amplify the effect of the tachometer signals so that a smaller reference voltage circuit and a smaller tachometer may be used. In FIGURE 4, the indicated positive terminal of the tachometer 52 is coupled to the movable tap 28 of the potentiometer 26 and the indicated negative terminal of the tachometer 52 is coupled through a voltage dividing network including two resistors 54, 55 to the cathode of the second rectifier 22. The junction of the voltage dividing resistors 54, 55 is coupled to the base of the transistor 53. The collector of the transistor 53 is coupled to one end of the reset winding 14, the other end of which is coupled to the lead 20. The emitter of the transistor 53 is coupled to the upper end of the potentiometer 26, this upper end being coupled through the limiting resistor 42 to the second rectifier 22. A Zener diode 56 is coupled in parallel with the potentiometer 26 to provide improved regulation. A protective rectifier 58 may also be coupled between the emitter and base of the transistor 53.

In operation, the tachometer 52 produces a signal which is coupled to the base of the PNP transistor 53 and which is of a polarity that tends to cause the transistor 53 to conduct. However, the resultant voltage at the junction of the resistors 54, 55, which is applied to the base of the transistor 53, is determined by the position of the movable tap 28 and the magnitude of the tachometer voltage. Thus, the transistor 53 is permitted to conduct current from its emitter to its collector to an extent determined by the difference between the voltage across the tachometer 52 and a voltage determined by the position of the movable tap 28. During the reset half cycles, this current from the emitter to the collector through the transistor 53 flows through the reset winding 14 to magnetize the core of the saturable core device to an extent determined by the magnitude of this current. Thus, during the next energizing half cycle (when the lead 18 is positive with respect to the lead 20), the controlled rectifier 34 is turned on at a time during this energizing half cycle determined by the magnetization of the core of the saturable core device. Otherwise, the circuit of FIGURE 4 functions substantially the same as the circuits shown in FIGURES 1, 2, and 3.

Figure 5:
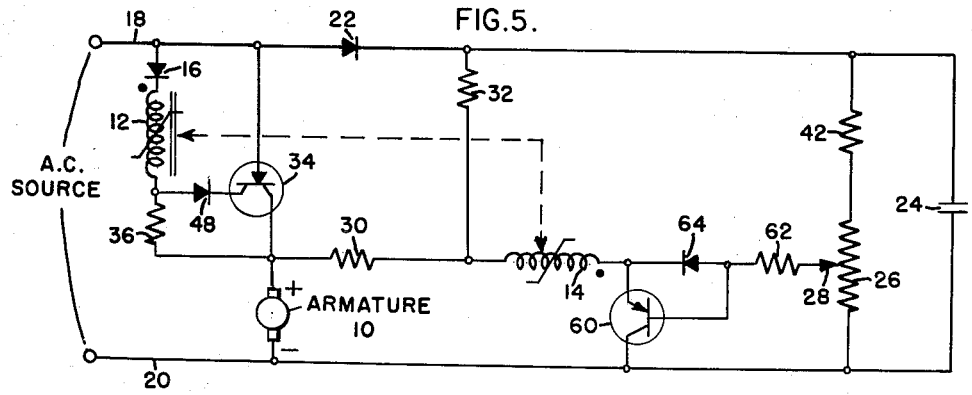
FIGURE 5 shows an embodiment in accordance with the invention that utilizes a transistor amplifier.

FIGURE 5 shows another embodiment of the invention, the embodiment of FIGURE 5 being similar to the embodiment of FIGURES 1, 2, and 3 except that amplification is provided between the movable tap 28 of the potentiometer 26 and between the reset winding 14. This amplification is provided by a PNP transistor 60 having its emitter coupled to one end of the reset winding 14 and its collector coupled to the lead 20. The base of the transistor 60 is coupled through a resistor 62 to the movable tap 28. A protective rectifier 64 may be coupled between the base and the emitter of the transistor 60. A resistor (not shown) may be coupled between the junction of the limiting resistor 42 and the potentiometer 26 and between the emitter of the transistor 60 if reset current in the forward direction is desired. The arrangement of FIGURE 5 provides increased regulating accuracy, particularly with respect to the potentiometer 26, by increasing the reference power level which is applied to the reset winding 14. Thus, it is possible to reduce the required number of turns on the reset winding 14 and still accomplish the desired reset as determined by the relative magnitudes of the back E.M.F. provided by the armature 10 and the reference voltage provided by the movable tap 28.

Figure 6:
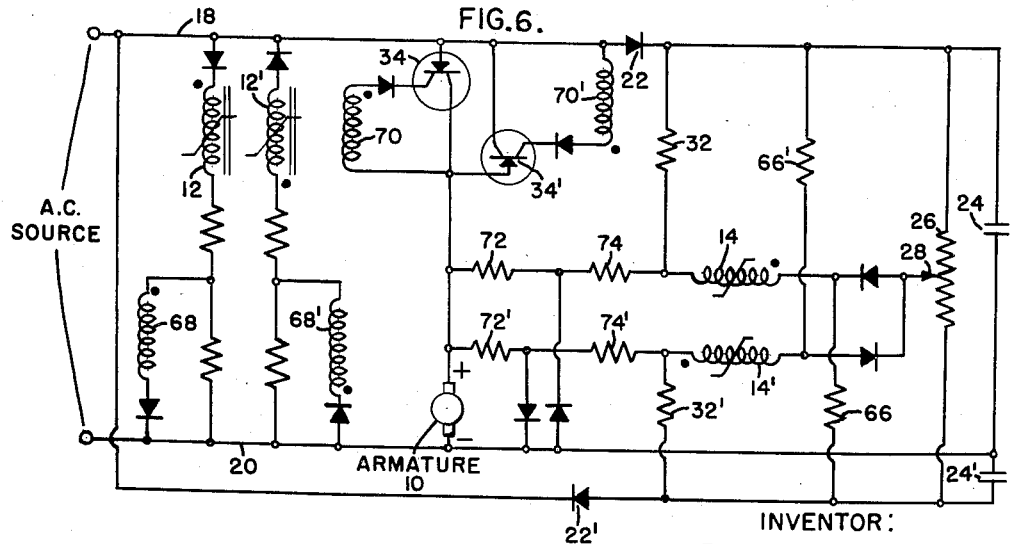
FIGURE 6 shows an embodiment of the invention for use with a motor armature which may be required to rotate in both directions.

FIGURE 6 shows an embodiment of the motor control circuit in accordance with the invention which permits the motor armature 10 to be operated in both directions. In FIGURE 6, the same components have been given the same reference numerals as in the previous figures, and in addition corresponding components for the reverse direction of operation have been given the same reference numerals followed by a prime. The coupling arrows and lines are omitted for clarity. In addition to the saturable core devices having the energizing windings 12, 12' and the reset windings 14, 14', two pulse transformers having respective primary windings 68, 68' and secondary windings 70, 70' are provided. The pulse transformers are coupled in a circuit with respective energizing windings 12, 12' and serve to couple the current which flows through the energizing windings 12, 12' to the controlled rectifier devices 34, 34'. The operation of the arrangement shown in FIGURE 6 is substantially the same for either direction of operation as the operation described for the previous figures. However, one feature of the arrangement of FIGURE 6 might be pointed out. When the armature 10 rotates in what is assumed to be the forward direction, the upper terminal of the armature 10 is positive and the lower terminal of the armature 10 is negative as shown. Under this condition, the circuit shown operates primarily with the components having unprimed reference numerals. Thus, reset of the saturable core device is accomplished through the reset winding 14 and control of the rectifier device 34 is effected through the energizing winding 12 and through the primary winding 68 and secondary winding 70 of the pulse transformer. As explained for the other embodiments, the armature 10 under the direction of operation assumed receives an energizing or driving pulse of current when the lead 18 is positive with respect to the lead 20, and the reset winding 14 is reset during the time that the lead 20 is positive with respect to the lead 18. During reset, the reset current takes a path which includes the positive terminal of the armature 10, the two resistors 72, 74, the reset winding 14 from left to right, a reset resistor 66, the rectifier device 22' and the lead 18. During both energizing and reset half cycles when the armature 10 is rotating in the forward direction assumed, the reset winding 14' receives reset current constantly so that there is no tendency for the armature 10 to rotate in the reverse direction. Operation for the armature 10 in the reverse direction would be comparable to the operation just described, but would utilize the components having primes on the respective reference numerals. During both energizing and reset half cycles when the armature 10 is rotating in the reverse direction, the reset winding 14 receives reset current constantly so that there is no tendency for the armature 10 to rotate in the forward direction.

In the various figures, it will be seen that certain features are included in certain figures, but omitted in other figures. Thus, the zero speed resistor 32 is shown in FIGURES 1, 2, 5, and 6 but is not shown in FIGURE 3 and is not needed in FIGURE 4. However, it should be pointed out that this zero speed resistor 32 may be included in FIGURE 3 and likewise may be omitted in FIGURES 1, 2, and 5. Also the energizing winding 12 and the first rectifier 16 used as shown in FIGURE 1 in the series circuit with the armature 10 may be substituted, with appropriate changes, for the silicon controlled rectifier device 34 in FIGURES 4, 5, and 6. In addition, persons skilled in the art will appreciate other changes and modifications which can be made in accordance with the spirit and scope of the invention.

The invention described in the various embodiments shown in the figures provides an improved and novel control circuit for controlling the speed of a direct current motor. The invention enables the desired speed of a direct current motor to be selected by means of the movable tap on the potentiometer and the invention maintains this speed at substantially the same selected level despite changes in load on the motor. As pointed out, the speed is maintained at the selected level because the operation of the invention is dependent upon a signal indicative of the armature speed as opposed to a signal indicative of the armature voltage. And although the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. A speed control circuit for a direct current motor having an armature, comprising a rectifier device coupled in a series circuit with said armature, a saturable core device having an energizing winding and a reset winding, means coupling said energizing winding to said series circuit to control the flow of current through said series circuit in accordance with the magnetization of said saturable core device, a source of reference voltage, and means including said reset winding in a circuit capable of passing reset current coupled to said source of reference voltage for comparing a voltage indicative of the speed of said armature with said reference voltage and providing a reset current in said reset winding, said reset current having a magnitude indicative of the difference between the magnitude of said speed voltage and the magnitude of said reference voltage.

2. A speed control circuit for a direct current motor having an armature, comprising a rectifier device coupled in a series circuit with said armature, a saturable core device having an energized winding and a reset winding, means coupling said energizing winding to said series circuit to control the flow of current through said series circuit in accordance with the magnetization of said saturable core device, a source of reference voltage, and means including said reset winding coupled to said source of reference voltage for comparing a voltage indicative of the speed of said armature with said reference voltage and providing a reset current having a magnitude indicative of the difference between the magnitude of said speed voltage and the magnitude of said reference voltage, said reset current magnetizing said saturable core device in a condition so that the current flow in said series circuit is controlled in accordance with the degree and direction of magnetization of said saturable core device.

3. A speed control circuit for a direct current motor having an armature; comprising a rectifier device coupled in a series circuit with said armature; a saturable core device having an energizing winding and a reset winding coupled thereto; means coupling said energizing winding to said series circuit to control the flow of current through said armature in accordance with the magnitude and direction of magnetization of said saturable core device; a source of unidirectional reference potential; further means for deriving a potential indicative of the speed of said armature; and comparing means coupling said source of reference potential to said further means, said comparing means including said reset winding coupled between one terminal of said source of reference potential and one terminal of said further means, said one terminals both having the same first polarity, and said comparing means further including means coupling a second terminal of said source of reference potential to the second terminal of said further means, said second terminals both having the same second polarity, so that a reset current having a magnitude and direction indicative of the relative magnitudes of the potentials on said one terminals flows in said reset winding to magnetize said saturable core device so that said energizing winding controls the current flow in said series circuit in accordance with the degree and direction of magnetization of said saturable core device.

4. A speed control circuit for a direct current motor having an armature; comprising a rectifier device coupled in a series circuit with said armature; a saturable core device, having an energizing winding and a reset winding coupled thereto; means coupling said energizing winding to said series circuit to control the flow of current through said armature in accordance with the magnitude and direction of magnetization of said saturable core device; a source of unidirectional reference potential; further means for deriving a potential indicative of the speed of said armature; and comparing means coupling said source of reference potential to said further means, said comparing means including said reset winding coupled between one terminal of said source of reference potential and one terminal of said further means, said one terminals both having the same first polarity, and said comparing means further including means coupling a second terminal of said source of reference potential to the second terminal of said further means, said second terminals both having the same second polarity which is opposite said first polarity, so that a reset current having a magnitude indicative of the relative magnitudes of the potentials on said one terminals flows in said reset winding between said one terminal of said further means and said one terminal of said source of reference potential.

5. A speed control circuit for a direct current motor having an armature, comprising a rectifier device coupled in a series circuit with said armature, first means for deriving a single indicative of the speed of said armature, a saturable core device having an energizing winding and a reset winding, means coupling said energizing winding to said series circuit to control the flow of current through said armature in accordance with the magnitude and direction of magnetization of said saturable core device, a source of unidirectional reference potential, and comparing means coupling said source of reference potential to said first means, said comparing means including an impedance capable of carrying direct current and said reset winding coupled in series between one terminal of said source of reference potential and one terminal of said first means so that a reset current flows in said reset winding to magnetize said saturable core device in a direction indicative of the relative magnitudes of said source of reference potential and said speed signal, said one terminal of said source of reference potential having a first polarity and said one terminal of said first means also having a potential of said first polarity, and said comparing means further including means coupling a second terminal of said source of reference potential to the second terminal of said first means, said second terminal of said source of reference potential having an opposite polarity relative to said first polarity and said second terminal of said first means also having a potential of said opposite polarity.

6. The control circuit defined in claim 5 and further including means coupled to a point between said impedance and said reset winding for supplying a unidirectional potential of said first polarity thereto.

7. A speed control circuit for a direct current motor having an armature, comprising first and second leads supplied with a source of alternating current, a saturable core device having an energizing winding and a reset winding, a rectifier device, means coupling said armature, said energizing winding, and said rectifier device in a circuit between said first and said second leads so that current flows through said armature and said rectifier device to an extent determined by said energizing winding and the magnetization of said saturable core device, a source of unidirectional reference potential, means coupling said reset winding between one terminal of said source of reference potential and one terminal of said armature, said one terminals both having the same first polarity, and means coupling a second terminal of said source of reference potential to the second terminal of said armature, said second terminals both having the same polarity which is opposite to said first polarity, so that a reset current having a magnitude and direction indicative of the relative magnitudes of the potentials on said one terminals flows in said reset winding to magnetize said saturable core and permit said energizing winding to control the current flow in said series circuit.

8. A speed control circuit for a direct current motor having an armature energized from first and second leads supplied with a source of alternating current, comprising a saturable core device having an energizing winding and a reset winding, a rectifier device having an anode and a cathode, means coupling said armature, said rectifier device, and said energizing winding in a first series circuit between said first and said second leads, a resistor, a source of unidirectional reference potential, means coupling said reset winding and said resistor in a second series circuit between one terminal of said source of reference potential and one terminal of said armature, said second series circuit being capable of carrying direct current in both directions and said one terminals having the same first polarity, means coupling a second terminal of said source of reference potential to the second terminal of said armature, said second terminals having the same polarity which is opposite said first polarity, whereby a reset current having a magnitude indicative of the relative magnitudes of the potentials on said one terminals flows in said reset winding to magnetize said saturable core device to an extent and thereby control the current flow in said rectifier device and said series circuit.

9. The control circuit defined in claim 8 and further including means coupled to a point between said resistor and said reset winding for supplying a unidirectional potential thereto.

10. A speed control circuit for a direct current motor having an armature energized from first and second leads supplied with a source of alternating current, comprising a saturable core device having an energizing winding and a reset winding, a controlled rectifier device having an anode, a cathode, and a control electrode, means coupling said armature and the anode-cathode path of said controlled rectifier device in a series circuit between said first and said second leads, a source of unidirectional reference potential, means coupling said reset winding between one terminal of said source of reference potential and one terminal of said armature so that direct current may flow in both directions between said one terminals, said one terminals having the same first polarity, means coupling a second terminal of said source of reference potential to the second terminal of said armature, said second terminals having the same polarity which is opposite said first polarity, whereby a reset current having a magnitude indicative of the relative magnitudes of the potentials on said one terminals flows in said reset winding to magnetize said saturable core device, and means coupling said energizing winding to said control electrode of said controlled rectifier device to control the current flow through said controlled rectifier device and thereby control the current flow in said series circuit.

11. A speed control for a direct current motor having an armature energized from first and second leads supplied with a source of alternating current, comprising a saturable core device having an energizing winding and a reset winding, a rectifier device having an anode and a cathode, means coupling said armature, said rectifier device, and said energizing winding in a series circuit between said first and said second leads, a source of unidirectional reference potential, a speed indicator device coupled to said armature for producing a potential indicative of the speed of said armature, means coupling said reset winding between one terminal of said source of reference potential and one terminal of said speed indicator device so that a reset current may flow in said reset winding to magnetize said saturable core device in such a condition that said energizing winding controls the current flow in said series circuit, said one terminals having the same first polarity, and means coupling a second terminal of said source of reference potential to a second terminal of said speed indicator device, said second terminals having the same polarity which is opposite said first polarity, whereby a reset current having a magnitude indicative to the relative magnitudes of the potentials on said one terminals flows in said reset windng.

12. A speed control circuit for a direct current motor having an armature energized from first and second leads supplied with a source of alternating current, comprising a saturable core device having an energizing winding and a reset winding, a controlled rectifier device having an anode, a cathode, and a control electrode, means coupling said armature and the anode-cathode path of said controlled rectifier device in a series circuit between said first and said second leads, means coupling said energizing winding to said control electrode for controlling the current flow in said series circuit in response to the degree of magnetization of said saturable core device, a source of unidirectional reference potential, a speed indicator device coupled to said armature for producing a potential indicative of the speed of said armature, means coupling said reset winding between one terminal of said source of reference potential and one terminal of said speed indicator device so that a reset current may flow in said reset winding to magnetize said saturable core device in such a condition that said energizing winding controls the current flow in said series circuit, said one terminals having the same first polarity, and means coupling a second terminal of said source of reference potential to a second terminal of said speed indicator device, said second terminals having the same polarity which is opposite said first polarity, whereby a reset current having a magnitude indicative to the relative magnitudes of the potentials on said one terminals flows in said reset winding.

No references cited.

UNITED STATES PATENT OFFICE
CERTIFICATE OF CORRECTION

Patent No. 3,024,401                     March 6, 1962

Edward H. Dinger

It is hereby certified that error appears in the above numbered patent requiring correction and that the said Letters Patent should read as corrected below.

Column 8, line 59, for "single" read -- signal --; column 10, line 41, for "windng" read -- winding --.

Signed and sealed this 21st day of August 1962.

(SEAL)
Attest:

ESTON G. JOHNSON
Attesting Officer

DAVID L. LADD
Commissioner of Patent